Patented June 30, 1942

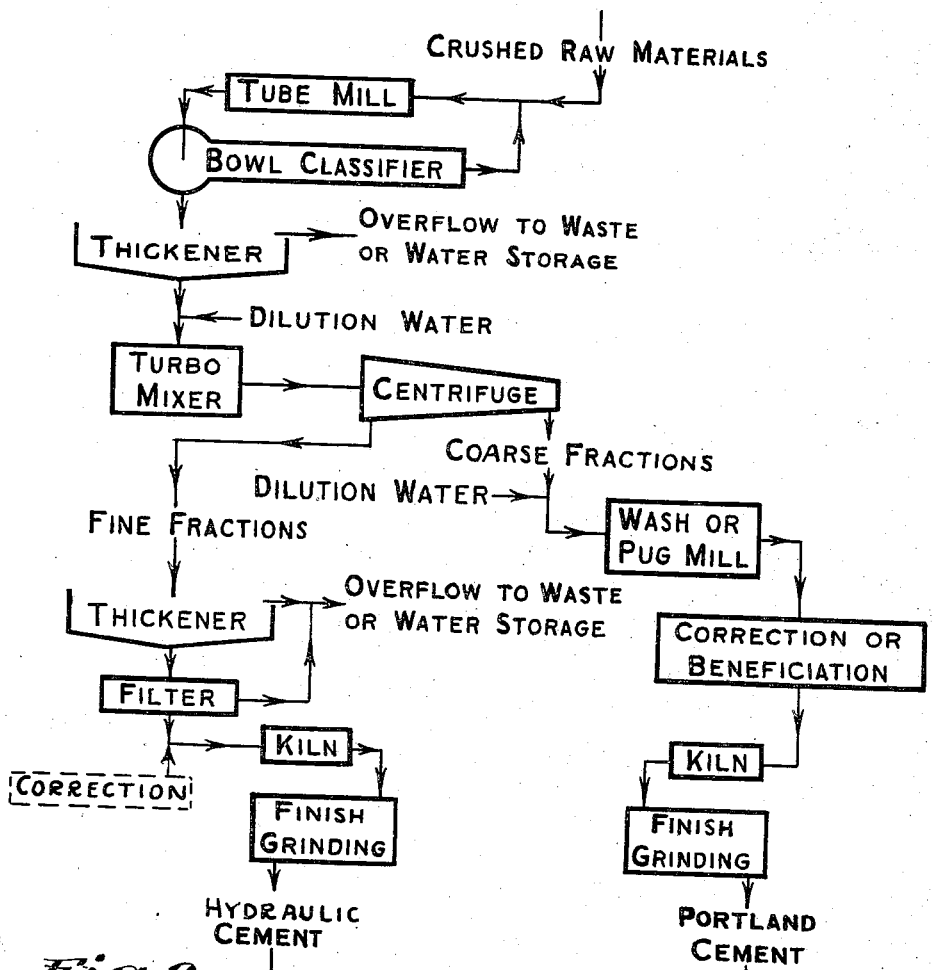
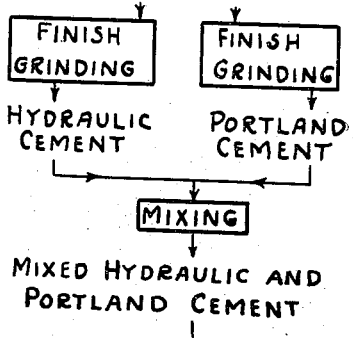
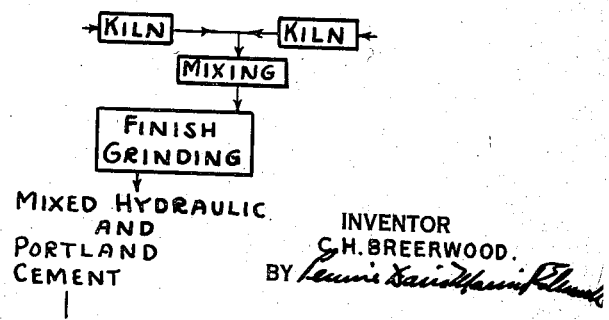

2,288,179

UNITED STATES PATENT OFFICE 2,288,179

CEMENT AND CEMENT MANUFACTURE

Charles H. Breerwood, Narberth, Pa., assignor to Valley Forge Cement Company, Catasauqua, Pa., a corporation of Pennsylvania Application April 16, 1940, Serial No. 329,841

15 Claims. (Cl. 106—100)

This invention relates to cement manufacture, and more particularly to a method of manufacturing improved hydraulic cements, of a type generally similar to and classifiable with "Natural" or "Rosendale" cements, from natural materials, of a limited class to be described hereinafter, of incorrect composition for the production either of ordinary natural cements or a Portland cement of a type desired. It has especially to do with the beneficiation of available natural raw materials, by a process in which grinding and particle size classification, among other means, are employed in combination to derive from the natural raw material at least two mixtures requiring little or no subsequent correction and which are separately burned and ground to produce, respectively, the improved hydraulic cement of the present invention and a Portland cement.

Natural or Rosendale cements have been defined as those "produced by burning a natural clayey limestone containing 15 to 40 per cent of silica, alumina and iron oxide without preliminary mixing and grinding. This burning takes place at a temperature that is usually little, if any, above that of an ordinary lime-kiln." To satisfy the present standard specification, A. S. T. M. designation C10-37, the temperature of calcination shall be no higher than is necessary to drive off carbonic acid gas. Since the raw materials were not pulverized and the constituent minerals were not in intimate mixture and contact, the finished cement contained substantial and unpredictable proportions of under-burned and over-burned compounds, inert ingredients and large and variable proportions of uncombined lime. Further uncertainty in behavior was due to the wide ranges in raw material composition tolerated, and to the absence of care in control of ultimate chemical composition. Because of these characteristics and the relatively inferior strengths developed, these cements have largely been abandoned in favor of Portland cements and their modifications.

Throughout the remainder of the specification and in the claims, the phrase "hydraulic cements" will be used to mean the cements of or made by the present invention, principally to avoid confusion with Portland cements, although it is recognized that the latter are hydraulics.

It is among the principal purposes of the present invention to produce hydraulic cements of uniform quality, and compound composition, and of predictable behavior, in which the uncombined or "free" lime content is low and comparable to that of Portland cements. These cements may be used for the purposes for which the early natural cements were adapted, including their mixture with Portland cements, in wide ranges of proportions, sometimes with quite limited proportions of the latter, to form masonry cements and mortars, but find their greatest utility when mixed with Portland cement or ground with Portland cement clinker, in proportions preferably not exceeding 40 per cent, and usually less, of the weight of the latter. Concrete made from such mixtures is highly plastic and workable, and less porous, more resistant to thawing and freezing and to sulphate and chloride solutions, such as sea water, of greater water-retention during hardening, and of greater strength in later periods than concrete made from an equal weight of the Portland cement used in the mixture. The present cements have exhibited high puzzolanic activity in concretes prepared from the mixtures described above, in which Portland cement comprises the major proportion of the mixture and which appear to be superior to the concretes prepared with the usual puzzolanic materials.

It is a further purpose of the invention to produce these cements from raw materials heretofore unsuitable or unsatisfactory for their manufacture, as well as inferior or unusable for the manufacture of Portland cements without substantial correction or beneficiation. To this end, the mineral constituents of these raw materials are separated to provide one fraction peculiarly suitable, by reference both to chemical composition and particle size of minerals in thorough mixture and contact, for burning at relatively low temperatures to produce the homogeneous and uniform hydraulic cements of the present invention, and a second fraction suitable for the production of a Portland cement of modern type, with little or no further correction or beneficiation prior to burning to clinker. Should the second fraction require correction or beneficiation, the degree of change required will be much less than that required for the original materials, if the latter are chemically adaptable to correction, and, if they are to be beneficiated by froth flotation, the removal of the fine fraction makes the remainder much more amenable to the flotation process. The new process has the unique economic advantage of making it possible to utilize all of the mineral constituents of an available material, either inferior or actually unusable except after treatment by a process of beneficiation in the manufacture of a cement of either class, without waste either of quantities of the constituents or the cost of grinding and preparing them. It, therefore, permits the manufacture of improved cements of both classes at lower costs, and, further, their manufacture in localities where the production of either would otherwise be economically impractical.

Further purposes and advantages will become apparent hereinafter, especially in the description of the behavior of the hydraulic cements resulting from variations in their compositions within the preferred range to be described.

The inferior or unsatisfactory raw materials contemplated herein are limited to the class consisting of argillaceous limestones, marls and chalks containing a proportion of calcium carbonate in excess of that suitable or desirable for natural cement manufacture, i. e. the material would have a "cementation index," to be defined hereinafter, too low for the production of a satisfactory or useful natural cement, and quantities of one or more silicate minerals, and usually impurities, beyond that permissible or desirable in a Portland cement raw material mixture. The class of materials also includes, in addition to those deficient in calcium carbonate for Portland cement manufacture, those containing excessive proportions of this essential constituent of Portland cement raw material mixtures, but in which the proportions of the silica and other argillaceous constituents are such that correction by additive, or substitution, methods is impractical or impossible. The class also includes certain materials contaminated by free alkalies and impurities, such as the magnesium hydroxide, brucite, undesirable in a Portland cement raw material mixture but harmless in a mixture for the production of a natural cement. The class of materials to which the process is appropriate is further limited to those in which the natural crystal size, or the particle size, of the silicate minerals, and impurities, is relatively much finer than the other mineral constituents or in which the silicate minerals, impurities, or both, are more readily reduced in grinding, in accordance with the preferred method of milling, to be referred to hereinafter.

I have discovered, that, when this limited class of materials is appropriately ground, these silicate minerals, and most of those which may be considered as impurities in a Portland cement raw material mixture, can be caused to be greatly increased in proportion to the other constituent minerals in the low orders of particle size, concentration of the silicates in quantities sufficient to raise the cementation index high enough for the composition of the desired hydraulic cement raw material mixture frequently occurring in the particle size fractions below about 3 to 5 microns. The larger particle size fractions are of relatively greater calcium carbonate (calcite) and silica (quartz or the like), and lower alumina content than the natural material, thereby making these fractions either satisfactory, or approaching satisfactory composition, for the manufacture of Portland cements of modern types.

The phrase "cementation index" is used herein to define the ratio of the argillaceous constituents to the oxides of calcium and magnesium, and also to indicate the minimum and maximum limits of the range of desirable composition. With relation to a hydraulic cement prepared in accordance with the present method, it also serves as a means to predict the characteristics or behavior that may be expected of the cement. By varying the cementation index, during the course of preparation of the hydraulic cement raw material mixture, cement can be produced to satisfy a wide range of uses, as will be described more fully hereinafter. The cementation index is determined as follows:

Cementation index=

$$\frac{(2.8 \times \%SiO_2) + (0.7 \times \%Fe_2O_3) + (1.1 \times \%Al_2O_3)}{(\%CaO) + (1.4 \times \%MgO)}$$

In determining the cementation index, it will be noted that the percentages used in the divisor are those of lime and magnesia and not their carbonates. The preferred compositions for the hydraulic cements of the present invention have a cementation index between the range 1.2 and 1.6. Although cements prepared from compositions having a cementation index as low as 1 and as high as 2 are useful for some purposes, those of the low index must be carefully burned and aged or seasoned to avoid unsoundness due to free lime, and if the index falls below 1 the product resembles an under-burned Portland cement. If the index approaches 2 or more, the hydraulic value decreases, the finished product having little strength in mortar and being practically useless except as an artificial puzzolan.

Hydraulic cements prepared from compositions having low indices, within the preferred range described above, being of relatively high lime content, require more care in burning, as will be described more fully hereinafter, but have relatively high strength characteristics when used alone and exhibit satisfactory puzzolanic activity when mixed in suitable proportions with Portland cement or ground with Portland cement clinker. Those of higher indices, being relatively more siliceous, are of lesser strength but increased puzzolanic value.

In general, the invention comprises reducing the natural material by grinding it, after preliminary crushing, to a degree at least sufficient to free the mineral bonds to release enough of the siliceous minerals, particularly the silicate mineral or minerals, together with proportions of minerals considered as impurities in Portland cement raw material mixtures, if present, from the calcite and quartz, or other natural forms of silicon dioxide, the grinding being so controlled that the proportions of the silicate minerals are increased, relatively to the calcite and quartz, in the lowest orders of particle size. To this end, the material is preferably ground in a tube or ball mill in closed circuit with an hydraulic classifier, such as the Dorr bowl classifier, the operation being so controlled, especially by carrying high circulating loads, that the bowl overflow or finished grinding product, is removed from the grinding circuit as soon as the desired proportion of the silicate minerals has been released, and reduced, if necessary, to the finest orders of particle size, and with a minimum reduction to these orders of size of the calcite and silica. If the silicate minerals are largely micaceous, as is frequently the case in raw materials of the class with which this invention is concerned, the micaceous matter is usually easily released from the other minerals during grinding and need not be reduced to extreme fineness to enable its separation with the other constituents of the lowest orders of particle size, since micaceous matter has a relatively low sedimentation rate due to particle shape and can be removed with the finer mineral particles in the classification step about to be described. Under these conditions, unnecessary reduction of calcite and quartz, with consequent excessive proportions in the lowest orders or particle size is avoided. For brevity, compositions described as having a fineness minus 3 to 5 microns, for example, will be understood to include micaceous particles, when present in the natural materials, of equivalent sedimentation rates, although they may actually be in the neighborhood of twice that maximum diameter.

In some materials of the class described, particularly the metamorphosed limestones, the calcite and silica occur in relatively large, frequently visible, crystals, the rock being contaminated by inclusions of fine clay minerals, including mica, widely dispersed. Such materials are preferably subjected to incomplete preliminary grinding, i. e., to a degree less than that suitable for an ultimate Portland cement raw material mixture or component thereof, preferably in a ball mill, and to a degree sufficient to release the clay minerals, the ground materials then being separated by hydraulic classification centrifugal sedimentation, in one or more stages, into a preliminary coarse and a fine fraction. This preliminary separation is preferably accomplished in a bowl-classifier or hydro-separator, for economy in power, and although such apparatus is relatively inefficient, as compared with a centrifugal sedimentation machine, satisfactory preliminary separations according to particle size can be made for the present purposes. The coarser fractions so separated are of higher calcite and silica content and lower in alumina bearing minerals, and consequently of higher silica ratio and are therefore much more suitable for use as a component of a Portland cement raw material mixture than the natural material. The fine fractions or overflow of the classifier usually represent a large proportion of the weight of the original material and comprise the source from which the composition to be used for the production of the natural cement is derived by a process involving controlled classification to be described hereinafter. The dilution of the overflow is ordinarily too great for efficient separation with the preferred type of apparatus and the materials are accordingly thickened, as by means of a sedimentation type thickener, before further treatment.

The natural materials ground as previously described, or the finer fractions separated by the preliminary classification described immediately above, are then subjected to classification so controlled that the "cut" or "split" is made at that point in the particle size range where the separated minor fractions will have a chemical composition of the desired cementation index, within the range described above, for the production of a hydraulic cement for a predetermined use. The coarser fractions, being of higher calcite and similar grade and of lower content in alumina and minerals characterized as impurities, if present, are reserved for the production of Portland cement. In some cases, as will be shown in an example given hereinafter, these coarser fractions are sometimes of satisfactory composition for the production of a modern type of Portland cement without further modification, but it will be understood that, depending upon the nature of the material and the actual chemical composition of the coarser particles, further change can be made by processes involving froth flotation, or by additive or substitution methods when the latter are practicable.

For the effective separation of compositions, within the preferred range of cementation indices previously described, the separation must almost always be made at such a low order of particle size that the operation is far beyond the practical limits of separation with the usual gravity-type classifiers. More specifically, the maximum particle size will frequently be at about 5 microns, or less, with the exception of mica particles of equivalent behavior during classification. I have discovered that centrifugal sedimentation machines of the type commonly employed for de-watering slurries and sometimes for the classification of solids can be operated in a novel manner to make a controlled and efficient separation of particle sizes below 2 to 3 microns, such machines being the only practical apparatus that I have discovered capable of separating at such low orders of particle size. Satisfactory machines of this type include the "Bird centrifuge," disclosed for example in Pfeiffer Patent No. 1,962,461, and the F. L. Smidth & Company centrifuge disclosed in Vogel-Jorgensen patent No. 2,174,857. The operation of the centrifugal separator for the purposes contemplated herein differs essentially from its use in de-watering, by the overloading of the machine to such a degree that the fine fractions, comprising the natural cement raw material mixture, are separated and discharged with the effluent. The operation of the centrifugal separator differs usually from that described in my Patent No. 2,214,715, by control to produce a fine fraction of a desired composition. By controlling the rate of feeding and the speed of the bowl or drum, and to a lesser degree the dilution of the feed, particle size fractions as fine as those described can be separated efficiently, and, by controlling this operation so that the "cut" or "split" is made at a point where the effluent contains, in addition to the fine clay minerals, a sufficient proportion of calcite, a composition of the desired cementation index can be separated with great accuracy.

The fine fractions so separated are ordinarily abundant in slimes, i. e., colloidal slimes, and frequently present unusual difficulties in thickening and filtering to a slurry of satisfactory moisture content for burning in a rotary kiln. If natural flocculation seriously interferes with the thickening operation, dispersing agents may be employed, and are preferably added to and mixed with the feed to the centrifuge in order to decrease flocculation during classification as well as in thickening. A dispersing agent was found to be unnecessary in the processing of the materials described in the example, but where dispersion is desirable, I have found that dispersion is complete following the introduction and agitation with the feed of approximately two pounds of calcium lignin sulphonate or sodium lignin sulphonate per ton of solids, and that about the same dispersion can be obtained with one pound of either agent used with one pound of soda ash, as more particularly described and claimed in my Patent No. 2,162,525.

The minerological composition of these fine fractions varies widely, within the range of chemical composition described, depending upon the composition of the natural material and the hardness and degree of crystallization of the constituents. The principal clay minerals commonly included and increased in proportion in this fraction include aluminum silicates, particularly kaolin and the various micas; magnesian silicates, usually talc or magnesian mica such as phlogopite, and carbonaceous matter. The alkali content is increased with increased concentrations of alkaline silicates, such as muscovite or sericite mica, and the soluble alkalies, in solution in the effluent, may be eliminated, if desired, by wasting the overflow water of the thickener.

None of the minerals referred to specifically above are definitely harmful and most of them are useful constituents of the raw material mixture for the production of natural cement. Relatively large proportions of alumina and magnesia are permissible and, if the magnesia is not useful, it has at least no harmful or dangerous effects in the finished hydraulic cement, as in Portland cement. The coarse fractions of the classification described above are beneficiated, by comparison with the natural material, to a degree such that in some cases they are chemically correct for burning to produce a desired Portland cement and in any case are made more amenable to beneficiation by froth flotation, and in some cases made satisfactory for correction by additive or substitution methods. For example, raw materials of the class defined, are usually excessive in alumina for modern types of Portland cement and are frequently contaminated with magnesia, alkalies, and other impurities, in excess of permissible limits. The removal of the colloidal and near-colloidal slimes in the effluent has the further advantage of making the ultimate Portland cement raw material mixture more suitable for burning because these fine fractions are eutectic and are "over-burned" at the temperatures required to combine the compounds of the coarser constituents of the mixture.

The fine fractions are preferably burned in a rotary kiln in a manner similar to the burning of Portland cement mixtures, but at lower temperatures. These temperatures are preferably above those at which the calcite is decomposed but less than those of "incipient fusion," as this phrase is understood in the art of Portland cement manufacture, and must be increased, to complete the reactions, with decreases in the cementation index, i. e., with increasing proportions of lime. By burning at temperatures above those necessary to decompose calcium and magnesium carbonates, the finished product is of negligible free lime content, comparable to modern Portland cements, and frequently need not be seasoned or aged to produce soundness. Since the particles are extremely fine, with a relatively much lower range in size, and in intimate mixture and contact, the burning reactions are completed and the desired compounds are formed at somewhat lower temperatures than those required in the burning of the ordinary natural cement raw materials. Although the preferred temperatures of burning and degree of reaction are greater than permitted under the present A. S. T. M. specification for natural cements, and the present products thereby involve a further departure from the accepted definition, they are of improved and uniform quality, less liable to unsoundness and neither their hydraulic nor puzzolanic characteristics are impaired.

The burned products, after the usual cooling, are ground with the necessary proportions of gypsum, or other retarders, to a fineness preferably comparable to modern Portland cement. It is to be understood that although the proportion of the weight of the original raw material utilized for the production of these hydraulic cements is ordinarily small, as compared with the proportion reserved for use in the manufacture of Portland cement, i. e., the coarser fractions, the relative quantity is consistent with the relative market for such products and its most important modern use, namely its mixture with a greater quantity of Portland cement, as a replacement for a minor proportion of the weight of the latter, for the production of the highly plastic, substantially waterproof and resistant concrete desired for use in highway construction, structures exposed to sea water and the like.

For a better understanding of the invention, reference is made to the accompanying drawing in which Fig. 1 illustrates a typical flow diagram appropriate for the processing of common types of natural raw materials within the class defined, Fig. 2 is a detail supplementary flow diagram illustrating the mixture of the hydraulic and Portland cements to produce a hydraulic mixture, and Fig. 3 is a detail, alternative to Fig. 2, illustrating the mixture of products of burning the low orders of particle size with Portland cement clinker prior to finish grinding to cement fineness, to produce a hydraulic mixture.

Referring to the drawing, it will be seen that the natural material, after being crushed to the usual secondary crusher sizing, is ground in a tube or ball mill, preferably the latter if the crystallization of calcite and silica is relatively coarse, in closed circuit with a bowl classifier operated with a heavy circulating load, whereby the finished products may be withdrawn from the circuit as bowl overflow as soon as the necessary proportions of the constituent minerals desired for the hydraulic cement raw material mixture have been released physically by grinding and to avoid any more than the essential reductions of calcite and silica grains to the lowest orders of particle size, i. e., to provide a minimum of these particles in the fractions minus usually about 3 to 5 microns. Satisfactory degrees of grinding in the manner described, with relation to common materials of the class defined, will be shown in the examples.

A limited number of raw materials of the class are of such coarse crystallization, particularly of the calcite, that the clay minerals are freed by preliminary grinding, sometimes to the neighborhood of minus 48 mesh. In such cases, the classifier overflow can be held at a dilution low enough for the centrifugal sedimentation step about to be described. In most cases, however, the bowl classifier overflow is delivered to a thickener to decrease the dilution to at least 35 percent solids, and preferably to a lower dilution, to reduce power consumption and the necessary centrifuge capacity, the capacity of a centrifuge being proportional to the rate of feeding in gallons. In either case, the products are withdrawn from the thickener and delivered to a turbo-mixer to maintain suspension, to provide a constant head and to permit the addition of variable quantities of dilution water, whereby the dilution and the rate of feed to the centrifugal sedimentation machine can be controlled accurately to provide an effluent of the desired composition. The operation of the centrifuge with reference to feeding rate, dilution and separating force expressed in multiples of gravity, will be understood from the data given in the examples. Essentially, the operation of the centrifuge comprises overloading it to a degree that will cause it to make the cut or split at that point in the particle size range where the lowest orders of particle size, as carried away in the effluent, will be of the desired composition for the hydraulic cement raw material mixture, or one which can readily be modified, as indicated by the term "correction" surrounded by dotted lines in Fig. 1, by additions of an available fine clay, for example, if the calcite is unusually fine.

The fine fractions, or effluent of the centrifuge, are delivered to a thickener of the usual sedimentation type. If the materials tend to flocculate excessively, a dispersing agent may be employed and is preferably introduced to the pulp in the turbo-mixer to improve the separation and to cause the materials to settle in the thickener with a minimum of water entrained in the underflow.

In view of the extreme fineness of the thickener underflow, the latter ordinarily requires further de-watering before burning. For this purpose, a filter or centrifuge of the type used for de-watering wet process Portland cement raw material slurries is satisfactory.

As previously described, burning is preferably carried out in a rotary kiln, the burned product being cooled and then ground, with the usual proportions of gypsum or other suitable retarders to a fineness equivalent to that of Portland cement. If burning has been conducted properly, as previously described, the proportion of free lime is low and hydration or seasoning, as usually practiced with natural cement, is in many cases unnecessary. If the coarse fractions, or centrifuge cake, are the product of a preliminary grinding step, and therefore too coarse for an ultimate Portland cement raw material mixture, they are preferably reduced to satisfactory fineness for burning or, if necessary, for further processing prior to burning. If further modification is necessary to produce specific types, they are diluted with the proper amount of water in a wash or pug mill and then subjected to correction or beneficiation, depending upon which method of treatment is appropriate in view of their chemical composition and the availability of materials for use as correctives.

*Examples*

The purposes of the invention, and the practice of the method, can best be explained by reference to the processing of typical common raw materials of the class contemplated. The materials were argillaceous limestones of the Lehigh Valley district of Pennsylvania, commonly known as "blue-stone" or "cement rock." They are among the most complex of the materials of the class, by reference both to mineralogical composition and fineness of natural crystallization, and will serve as excellent specimens to illustrate the complete practice of the method, and to show how it may be applied to best advantage in the processing of other materials of more simple composition. The materials are further identifiable as Jacksonburg limestone, this formation being almost invariably too high in calcium carbonate (calcite) to produce a satisfactory natural cement or a hydraulic cement of the present invention, i. e., mixtures within the preferred range of cementation indices. Likewise, with rare exceptions, they are inferior for the manufacture of Portland cements, particularly the modern types, in that they are deficient in calcite; excessive in siliceous matter, but deficient in mineral forms of silicon dioxide (silica); excessive in alumina; about satisfactory in iron oxide for the manufacture of ordinary cements, but deficient in iron oxide for several types, contaminated with magnesia, ordinarily to a dangerous degree; contaminated by graphitic carbon, probably colloidal, and contaminated with alkalies, both combined and soluble.

The material of Test No. 1 is especially suitable for purposes of illustration, as it is apparently one of the most difficult to beneficiate in accordance with the practice of the present method. As will appear more fully from the table of analyses given hereinafter, it represents an extreme case in that the natural material is of unusually high silica ratio and both it and the coarser fractions derived from it are within the possible but low limits of cementation index. The fine fractions represent an unusually large proportion of the weight, and are within the preferred range of composition for the production of a hydraulic cement of high hydraulic value. The material of this test will be described in detail, the test serving to illustrate the separation of a coarse fraction of excellent composition which satisfies the requirements for an ultimate mixture for the production of a Portland cement within present specifications for highway cements and the Federal specification for Moderate heat of hardening cement.

In common with the Jacksonburg limestones of the other tests referred to, the principal difficulty in processing has to do with the unusually fine state of natural crystallization, and the wide distribution of the various constituents and the almost complete dispersion of colloidal or near-colloidal "graphitic" carbon. These materials are intermediate in composition between limestone and shale, the color and general appearance more nearly resembling slate, but calcite is the most abundant mineral. The other principal mineral constituents are quartz; mica, mostly of the sericite variety, but magnesian micas, probably phlogopite are believed to be present; talc; kaolin; iron, principally as the hydroxide, limonite, and dolomite, which contribute a substantial proportion of the magnesia. The fineness and limited degree of crystallization make accurate identification by petrographic methods difficult, the difficulty being increased by the presence and wide dispersion of colloidal carbon, but it is believed, from analytical determinations and examinations of related metamorphosed limestones from the same locality, that finely divided clay minerals such as kaolin and talc are present and contribute to the proportions of alumina and magnesia respectively. This belief is supported by the analyses of the fractions of each of the tests other than Test No. 1, which shows that in that material the source of the magnesia was largely dolomite. Thin sections of the rock reveal distinct layers of fine calcite grains alternating with thin layers of fine scaly and fibrous sericite. There are occasional elongate lenses and elongated isolated grains of quartz. The quartz is widely distributed, usually as fine grains in excess of 10 microns in diameter. The carbonaceous matter is dispersed throughout the rock in intimate contact with the various constituents, and constitutes about one half of 1 percent of the total mineral weight. The total alkalies are usually less than 1 percent, the normal range of the material in the locality being from 0.4 to 1.5, depending particularly upon the proportion of micaceous matter. Some sulphur is present in combination with a part of the iron as pyrite or pyrrhotite.

Re-crystallization in each of these materials was so incomplete that extremely fine grinding was necessary to free a sufficient proportion of the micaceous matter, particularly sericite, and the other clay minerals and colloidal matter, petrographic examination of ground specimens having disclosed that mineral bond breakage is incomplete in the particle size fractions above about 20 microns. The materials were accordingly ground in closed circuit and the ground products were then subjected to centrifugal sedimentation in a "Bird" centrifuge having a bowl size of 18″ x 28″. The operting conditions of the centrifuge were as follows:

are given in the following table. This table also serves to illustrate the ability of the process to derive more than one pair of products from the same feed, or natural material, for the production of both hydraulic and Portland cements of different compositions. This will be seen by reference to Tests Nos. 3 and 4, the products of which were derived from the same feed, as well as Tests Nos. 5 and 6, the products of which were both derived from another material:

*Chemical analyses as percent and cementation indices*

|  | Test No. 1 | | | Test No. 2 | | | Test No. 3 | | | Test No. 4 | | Test No. 5 | | | Test No. 6 | |
| --- | --- | --- | --- | --- | --- | --- | --- | --- | --- | --- | --- | --- | --- | --- | --- | --- |
|  | Feed | Eff. | Cake | Feed | Eff. | Cake | Feed | Eff. | Cake | Eff. | Cake | Feed | Eff. | Cake | Eff. | Cake |
| Percent weight | 100 | 45.0 | 55.0 | 100 | 19.5 | 80.5 | 100 | 8.9 | 91.1 | 15.0 | 85.0 | 100 | 6.6 | 93.4 | 11.2 | 88.8 |
| $SiO_2$ | 16.2 | 17.34 | 15.52 | 16.26 | 18.5 | 15.68 | 13.6 | 17.84 | 12.9 | 17.28 | 12.96 | 13.96 | 16.58 | 13.78 | 16.6 | 13.72 |
| $Fe_2O_3$ | 1.51 | 1.55 | 1.51 | 1.58 | 2.01 | 1.44 | 1.8 | 2.63 | 1.44 | 2.45 | 1.51 | 1.83 | 2.16 | 1.8 | 2.3 | 1.8 |
| $Al_2O_3$ | 3.67 | 4.75 | 3.17 | 3.76 | 6.45 | 3.08 | 5.56 | 11.71 | 5.16 | 10.89 | 4.55 | 5.48 | 10.94 | 5.14 | 10.34 | 4.76 |
| $CaCO_3$ | 73.21 | 70.98 | 75.17 | 73.57 | 66.96 | 75.35 | 74.1 | 57.3 | 76.4 | 60.0 | 76.96 | 73.66 | 61.5 | 75.0 | 61.95 | 75.91 |
| CaO | 41.0 | 39.75 | 42.1 | 41.2 | 37.5 | 42.2 | 41.5 | 32.09 | 42.78 | 36.6 | 43.10 | 41.25 | 34.44 | 42.0 | 34.69 | 42.51 |
| $MgCO_3$ | 4.71 | 4.56 | 5.30 | 4.88 | 4.67 | 5.16 | 4.27 | 5.22 | 4.12 | 5.08 | 3.86 | 4.31 | 5.15 | 3.56 | 5.96 | 4.06 |
| MgO | 2.25 | 2.18 | 2.53 | 2.33 | 2.23 | 2.46 | 2.04 | 2.49 | 1.97 | 2.42 | 1.84 | 2.05 | 2.46 | 1.7 | 2.82 | 1.94 |
| Silica ratio | 3.12 | 2.75 | 3.31 | 3.04 | 2.18 | 3.46 | 1.84 | 1.25 | 1.96 | 1.29 | 2.12 | 1.91 | 1.26 | 2.00 | 1.31 | 2.10 |
| Index | 1.14 | 1.28 | 1.07 | 1.14 | 1.48 | 1.05 | 1.03 | 1.8 | 1.16 | 1.67 | 0.9 | 1.05 | 1.59 | 1.03 | 1.56 | 1.00 |

*Classification controls*

|  | Test No. — | | | | | |
| --- | --- | --- | --- | --- | --- | --- |
|  | 1 | 2 | 3 | 4 | 5 | 6 |
| Bowl R. P. M | 600 | 1200 | 1895 | 1895 | 1615 | 1615 |
| Screw R. P. M | 16.7 | 35.5 | 24.8 | 24.8 | 20.2 | 20.2 |
| Force, times gravity | 90 | 360 | 985 | 985 | 650 | 650 |
| Feed, G. P. M | 23.3 | 23.3 | 5.3 | 8.6 | 8.9 | 11.5 |
| Feed, percent solids | 35.0 | 34.2 | 34.8 | 34.8 | 35.1 | 35.1 |
| Effluent, percent solids | 21.2 | 10.7 | 5.0 | 8.4 | 4.2 | 6.7 |
| Cake, percent solids | 74.2 | 73.2 | 75.1 | 74.5 | 74.5 | 75.5 |

By varying and controlling the operating conditions of the centrifuge, as previously described, and as indicated in the foregoing table, appropriately to the material treated, the compositions of the products desired, or both, wide range separations in particle size distribution are obtainable. The fineness of the ground material, as subjected to centrifugal sedimentation, or the "feed," and that of the separated products is expressed in terms of cumulative percentages of weight above maximum sizes in the following table of particle size distribution, and attention is especially directed to the extreme fineness and variation in particle size distribution between the fine fractions, or hydraulic cement raw material mixtures, referred to as "effluent:"

Probably the most significant data in the foregoing table are the relative weights of the separated products of all of the tests and the relations between these weights and the cementation indices given in the lowest line. By reference to Test 1, it will be seen that the feed as well as both products are within the permissible range in cementation index, but that of the effluent is substantially that of the minimum desirable index, this composition being preferred for the production of the sound natural cements of highest hydraulic value, within the limits of safety. The natural raw material is somewhat deficient in calcium carbonate for the production of Portland cement, but the composition is such that correction by additive or substitution methods, or beneficiation by froth flotation may easily be accomplished. However, it will be seen by reference to the composition of the cake, that the latter has been beneficiated to such a degree that it can be used without further modification for the production of Portland cement of special quality, particularly to satisfy the specification requirements for New Jersey State highway cement and the Federal specification for Moderate heat of hardening cement.

The products of Test No. 2 were separated at a lower particle size range, and, although the natural material was similar in composition to that of Test 1, it will be seen that the cementation index of the effluent has been increased to provide a composition of satisfactory hydraulic

*Physical analyses as percent plus*

| Size in microns | Test No. 1 | | | Test No. 2 | | | Tests Nos. 3 and 4 | | Tests Nos. 5 and 6 | | |
| --- | --- | --- | --- | --- | --- | --- | --- | --- | --- | --- | --- |
|  | Feed | Eff. | Cake | Feed | Eff. | Cake | Feed | Eff. | Feed | Eff. | Eff. |
| +44 | 14.7 | ------ | 24.0 | 12.6 | ------ | 16.1 | 6.7 | ------ | 16.5 | ------ | ------ |
| +30 | 19.5 | ------ | 32.0 | 15.7 | ------ | 21.1 | 15.8 | ------ | 32.5 | ------ | ------ |
| +20 | 28.5 | ------ | 46.8 | 22.4 | ------ | 34.0 | 18.4 | ------ | 40.9 | ------ | ------ |
| +15 | 35.6 | None | 58.4 | 30.2 | ------ | 49.3 | 29.7 | None | 49.5 | None | None |
| +10 | 48.6 | 19.8 | 71.9 | 47.9 | None | 69.2 | 37.7 | 1.5 | 57.5 | 0.85 | 0.9 |
| +5 | 68.7 | 54.4 | 81.6 | 70.1 | 23.8 | 92.5 | 50.0 | 4.5 | 68.6 | 3.7 | 6.1 |
| +2 | 81.7 | 77.0 | 86.0 | 86.2 | 64.0 | 96.8 | 61.4 | 30.0 | 78.2 | 22.3 | 32.1 |

The comparative weights of the effluents and cakes, and which should be considered with the particle size distributions set forth in the preceding table, and the chemical analyses of the natural materials, and the two products obtained value but of greater puzzolanic activity than that of Test 1. Similarly, the coarser fractions, or cake, have been beneficiated to a degree such that Portland cement of high quality can be produced from it without modification, but it will be understood that this product is also susceptible of easy further correction or beneficiation.

The raw material of Tests Nos. 3 and 4 may be described as inferior either for the production of natural or the present hydraulic cements, as shown by its cementation index, or for the production of a satisfactory modern type of Portland cement, as shown especially by the low silica ratio. Although this material could be beneficiated by froth flotation to produce satisfactory compositions for the production of modern types of Portland cement, it will be seen that the relatively high proportion of alumina, in view of the proportions of the other constituents, would make this material unsatisfactory for correction by substitution or additive methods for the production of such types. By reference to the composition of the effluent of Test No. 3, it will be seen that the small proportion of weight was insufficient to provide a satisfactory proportion of the calcite grains, the cementation index of this product being above the preferred upper limit, although this product could be burned to produce a material of high puzzolanic activity. By increasing the proportion of the effluent, by weight, by exercising the control of the centrifuge, as outlined in the first table above, it will be seen that the cementation index was decreased to approximately the upper limit of the preferred range, at the same time improving the composition of the cake to a degree that correction is practical.

The raw material, or feed, of Tests Nos. 5 and 6 likewise is inferior for the production of Portland cement, in that it is deficient in calcite, excessive in alumina, of low silica ratio, and of low cementation index for the production of natural or the present hydraulic cement. The two effluents produced are of satisfactory cementation index, and it will be seen that the cakes are satisfactory for the production of ordinary Portland cements without modification, and it will be understood that they may be beneficiated for the production of cements of special types.

For brevity, the actual manufacture of hydraulic cement from the fine fractions will be limited to that of Test No. 1, since in view of its low cementation index (high lime content) as compared with the fine products of the other tests, it is the most difficult to burn to form an ultimate product of uniform composition and low free lime content, i. e., it is the most difficult to burn to a sound hydraulic cement. Proportions of this material were burned at various temperatures to determine the preferred degree with reference to the behavior of the finished cement. When burned to satisfy the A. S. T. M. definition, i. e., at a temperature no higher than is necessary to drive off carbonic acid gas, the product had a free lime content of 7 per cent and the puzzolanic activity was negligible.

At a temperature of 1800° F., which is substantially above that of decomposition and the specification limit, the free lime content was 6 percent and the quality was improved. These cements were seasoned to slake the free lime. Both cements complied with the strength and setting requirements and were sound under the boiling test of the specification. The preferred burning temperature was determined to be 2,400° F., the actual temperature at which the material was burned, as measured by an optical pyrometer, being 2,416° F. This product had a free lime analysis of 0.34 and satisfied all of the requirements of the specification other than the actual definition itself. Some of this hydraulic cement, at a fineness of 93.8% minus 325 mesh sieve, was mixed with Portland cement at the ratio of 40 to 60 per cent Portland cement, the proportion of hydraulic cement being deliberately made higher than the usual 30 per cent, or less, ordinarily used commercially in puzzolan-Portland cement mixtures. Tensile strength tests of standard briquettes showed lesser strengths in the earlier test periods, but an average gain of 21.2 per cent over briquettes made with an equal weight of the same Portland cement at 28 days. This increased strength at later periods may be attributed to the greater degree of density and plasticity, increased retention of water during hardening, and puzzolanic reaction, the progression in strength throughout the test period being comparable to that of other puzzolanic materials in Portland cement concrete.

I claim:

1. The method of manufacturing a hydraulic cement in which an available natural material containing calcium carbonate in an amount in excess of that essential to produce the cement is utilized as the source of at least the principal proportion of the raw material mixture, and in which the material is a member of the class consisting of argillaceous limestones, marls and chalks, each containing substantial proportions of at least one siliceous mineral which can be released and increased in proportion to the calcium carbonate in the low orders of particle size by grinding the material, which comprises grinding the material to a degree sufficient to free a proportion of siliceous mineral particles at least equal to the proportion thereof desired for said raw material mixture and to concentrate said proportion and increase the relative proportion of said siliceous mineral to the proportion of calcium carbonate in the low orders of particle size, subjecting a slurry of the material so ground to particle size classification so controlled that the separation is made at that point in the particle size range where the relative proportions of said siliceous mineral and calcium carbonate are satisfactory for the mixture, thickening the low orders of particle size so separated and utilizing them as at least the major proportion of the ultimate raw material mixture, burning said mixture for a time and at a temperature at least sufficient to liberate carbon dioxide but below that of incipient fusion, cooling the products resulting from burning said low orders of particle size and grinding them to cement fineness.

2. The method of manufacturing a hydraulic cement in which an available natural material containing calcium carbonate in an amount in excess of that essential to produce the cement is utilized as the source of at least the principal proportion of the raw material mixture, and in which the material is a member of the class consisting of argillaceous limestones, marls and chalks, each containing substantial proportions of siliceous matter, including at least one silicate mineral, which can be released or increased in proportion to the calcium carbonate in the low orders of particle size by grinding the material, which comprises grinding the material to a degree sufficient to free a proportion of siliceous mineral particles at least equal to the proportion thereof desired for said raw material mixture and to concentrate said proportion and increase the relative proportion of said siliceous mineral to the proportion of calcium carbonate in the low orders of particle size, subjecting a slurry of the material so ground to particle size classification so controlled that the separation is made at a point in the particle size range where the fine fractions will have a cementation index not less than 1 and not more than 2, thickening the fine fractions so separated and utilizing them as at least the major proportion of the ultimate raw material mixture, burning said mixture for a time and at a temperature at least sufficient to liberate carbon dioxide but below that of incipient fusion, cooling the products resulting from burning said fine fractions and grinding them to cement fineness.

3. The method of manufacturing a hydraulic cement in which an available natural material unsatisfactory for the manufacture of the cement is utilized as the source of at least the principal proportion of the raw material mixture, and in which the material is a member of the class consisting of argillaceous limestones, marls and chalks, each containing siliceous matter, including at least one silicate mineral, which can be released and increased in proportion to the calcium carbonate in the low orders of particle size by grinding the material, which comprises grinding the material to a degree sufficient to free a proportion of siliceous mineral particles at least equal to the proportion thereof desired for said raw material mixture and to concentrate said proportion and increase the relative proportion of said siliceous mineral to the proportion of calcium carbonate in the low orders of particle size, subjecting a slurry of the material so ground to particle size classification so controlled that the separation is made at a point in the particle size range where the fine fractions will have a cementation index not less than 1 and not more than 2, thickening the fine fractions so separated and utilizing them as at least the major proportion of the ultimate raw material mixture, burning said mixture for a time and at a temperature at least sufficient to liberate carbon dioxide but below that of incipient fusion, cooling the products resulting from burning said fine fractions and grinding them to cement fineness.

4. The method of manufacturing a hydraulic cement in which an available natural material having a cementation index less than that desired for the manufacture of the cement is utilized as the source of at least the principal proportion of the raw material mixture, and in which the material is a member of the class consisting of argillaceous limestones, marls and chalks, each containing siliceous matter, including at least one silicate mineral, which can be released and increased in proportion to the calcium carbonate in the low orders of particle size by grinding the material, which comprises grinding the material to a degree sufficient to free a proportion of siliceous mineral particles at least equal to the proportion thereof desired for said raw material mixture and to concentrate said proportion and increase the relative proportion of siliceous mineral to the proportion of calcium carbonate in the low orders of particle size, subjecting a slurry of the material so ground to centrifugal sedimentation so correlated as to the speed of rotation, the dilution and rate of feeding of the material that the low orders of particle size are cut and separated as an effluent at that point in the particle size range where said low orders of particle size will have a cementation index not less than 1 and not more than 2, thickening the low orders of size so separated and utilizing them as at least the major proportion of the ultimate raw material mixture, burning said mixture for a time and at a temperature at least sufficient to liberate carbon dioxide but below that of incipient fusion, cooling the products resulting from burning said low orders of size and grinding them to cement fineness.

5. The method of manufacturing a hydraulic cement in which an available natural material having a cementation index less than 1.2 is utilized as the source of at least the principal proportion of the raw material mixture, and in which the material is a member of the class consisting of argillaceous limestones, marls and chalks, each containing siliceous matter, including at least one silicate mineral, which can be released and increased in proportion to the calcium carbonate in the low orders of particle size by grinding the material, which comprises grinding the material to a degree sufficient to free a proportion of siliceous mineral particles at least equal to the proportion thereof desired for said raw material mixture and to concentrate said proportion and increase the relative proportion of siliceous mineral to the proportion of calcium carbonate in the low order of particle size, subjecting a slurry of the material so ground to centrifugal sedimentation so correlated as to the speed of rotation, the dilution and rate of feeding of the material that the low orders of particle size are cut and separated as an effluent at that point in the particle size range where said low orders of particle size will have a cementation index not less than 1.2 and not more than 2, thickening the low orders of size so separated and utilizing them as at least the major proportion of the ultimate raw material mixture, burning said mixture for a time and at a temperature at least sufficient to liberate carbon dioxide but below that of incipient fusion, cooling the products resulting from burning said low orders of size and grinding them to cement fineness.

6. The method of manufacturing a hydraulic cement in which an available natural material having a cementation index less than 1.2 and a chemical composition unsuitable for the production of a desired Portland cement is utilized as the source of at least the principal proportion of the raw material mixture, and in which the material is a member of the class consisting of argillaceous limestones, marls and chalks, each containing siliceous matter, including at least one silicate mineral, which can be released and increased in proportion to the calcium carbonate in the low orders of particle size by grinding the material, which comprises grinding the material to a degree sufficient to free a proportion of siliceous mineral particles at least equal to the proportion thereof desired for said raw material mixture to concentrate said proportion and increase the relative proportion of siliceous mineral to the proportion of calcium carbonate in the particle size range not exceeding 10 microns, subjecting a slurry of the material so ground to centrifugal sedimentation so correlated as to the speed of rotation, the dilution and rate of feeding of the material that the orders of particle size not exceeding 10 microns are cut and separated as an effluent, thickening said orders of particle size and utilizing them as at least the major proportion of the ultimate hydraulic cement raw material mixture, burning said mixture for a time and at a temperature at least sufficient to liberate carbon dioxide but below that of incipient fusion, cooling the products resulting from burning said orders of size and grinding them to cement fineness.

7. The method of manufacturing a hydraulic cement in which an available natural material having a cementation index less than 1.2 and a chemical composition unsuitable for the production of a desired Portland cement is utilized as the source of at least the principal proportion of the raw material mixture, and in which the material is a member of the class consisting of argillaceous limestones, marls and chalks, each containing siliceous matter, including at least one silicate mineral, which can be released and increased in proportion to the calcium carbonate in the low orders of particle size by grinding the material, which comprises grinding the material to a degree sufficient to free a proportion of siliceous mineral particles at least equal to the proportion thereof desired for said raw material mixture to concentrate said proportion and increase the relative proportion of siliceous mineral to the proportion of calcium carbonate in the particle size range not exceeding 5 microns, subjecting a slurry of the material so ground to centrifugal sedimentation so correlated as to the speed of rotation, the dilution and rate of feeding of the material that the orders of particle size not exceeding 5 microns are cut and separated as an effluent, thickening said orders of particle size and utilizing them as at least the major proportion of the ultimate hydraulic cement raw material mixture, burning said mixture for a time and at a temperature at least sufficient to liberate carbon dioxide but below that of incipient fusion, cooling the products resulting from burning said orders of particle size and grinding them to cement fineness.

8. The method of manufacturing a hydraulic cement in which an available natural material having a cementation index lower than that desired for the raw material mixture is utilized as the source of at least the principal proportion of the raw material mixture, and in which the material is a member of the class consisting of argillaceous limestones, marls and chalks, each containing siliceous matter including at least one silicate mineral, which can be released and increased in proportion to the calcium carbonate in the low orders of particle size by grinding the material, which comprises grinding the material to a degree sufficient to free a proportion of siliceous mineral particles at least equal to the proportion thereof desired for said raw material mixture and to concentrate said proportion and increase the relative proportion of siliceous mineral to the calcium carbonate in the low orders of particle size, subjecting a slurry of the material so ground to centrifugal sedimentation so correlated as to the speed of rotation, dilution and rate of feeding the material that the low orders of particle size are cut and separated as an effluent at that point in the particle size range where the said low orders will have a cementation index not less than 1 and not more than 2, thickening the low orders of size so separated and utilizing them as at least the major proportion of the ultimate raw material mixture, burning said mixture for a time and at a temperature in excess of that necessary to liberate carbon dioxide but below that of incipient fusion, cooling the products resulting from burning said low orders of particle size and grinding them to cement fineness.

9. The method of manufacturing a hydraulic cement in which an available natural material having a cementation index lower than 1.2 is utilized as the source of at least the principal proportion of the raw material mixture, and in which the material is a member of the class consisting of argillaceous limestones, marls and chalks, each containing siliceous matter including at least one silicate mineral, which can be released and increased in proportion to the calcium carbonate in the low orders of particle size by grinding the material, which comprises grinding the material to a degree sufficient to free a proportion of siliceous mineral particles at least equal to the proportion thereof desired for said raw material mixture and to concentrate said proportion and increase the relative proportion of siliceous mineral to the calcium carbonate in the low orders of particle size, subjecting a slurry of the material so ground to centrifugal sedimentation so correlated as to the speed of rotation, dilution and rate of feeding the material that the low orders of particle size are cut and separated as an effluent at that point in the particle size range where the low orders will have a cementation index not less than 1.2 and not more than 2, thickening the low orders of size so separated and utilizing them as at least the major proportion of the ultimate raw material mixture, burning said mixture for a time and at a temperature in excess of that ncessary to liberate carbon dioxide but below that of incipient fusion, cooling the products resulting from burning said low orders of size and grinding them to cement fineness.

10. The method of manufacturing a hydraulic cement in which an available natural material having a cementation index lower than 1.2 is utilized as the source of at least the principal proportion of the raw material mixture, and in which the material is a member of the class consisting of argillaceous limestones, marls and chalks, each containing siliceous matter including at least one silicate mineral, which can be released and increased in proportion to the calcium carbonate in the low orders of particle size by grinding the material, which comprises grinding the material to a degree sufficient to free a proportion of siliceous mineral particles at least equal to the proportion thereof desired for said raw material mixture and to concentrate said proportion and increase the relative proportion of siliceous mineral to the calcium carbonate in the low orders of particle size, subjecting a slurry of the material so ground to centrifugal sedimentation so correlated as to the speed of rotation, dilution and rate of feeding the material that the low orders of particle size are cut and separated as an effluent at that point in the particle size range where the low orders will have a cementation index not less than 1.2 or more than 1.6, thickening the low orders of size so separated and utilizing them as at least the major proportion of the ultimate raw material mixture, burning said mixture for a time and at a temperature in excess of that necessary to liberate carbon dioxide but below that of incipient fusion, cooling the products resulting from burning said low orders of size and grinding them to cement fineness.

11. The method of manufacturing a hydraulic cement in which an available natural material having a cementation index less than 1.2 and a chemical composition unsuitable for the production of a desired Portland cement is utilized as the source of at least the principal proportion of the raw material mixture, and in which the material is a member of the class consisting of argillaceous limestones, marls and chalks, each containing siliceous matter, including at least one silicate mineral, which can be released and increased in proportion to the calcium carbonate in the low orders of particle size by grinding the material, which comprises grinding the material to a degree sufficient to free a proportion of siliceous mineral particles at least equal to the proportion thereof desired for said raw material mixture to concentrate said proportion and increase the relative proportion of siliceous mineral to the proportion of calcium carbonate in the particle size range not exceeding 10 microns, subjecting a slurry of the material so ground to centrifugal sedimentation so correlated as to the speed of rotation, the dilution and rate of feeding of the material that the orders of particle size not exceeding 10 microns are cut and separated as an effluent, thickening said orders of particle size and utilizing them as at least the major proportion of the ultimate hydraulic cement raw material mixture, burning said mixture for a time and at a temperature in excess of that necessary to liberate carbon dioxide but below that of incipient fusion, cooling the products resulting from burning said orders of size and grinding them to cement fineness.

12. The method of manufacturing hydraulic cements and using substantially all of the weight of constituents of an available natural raw material, having a cementation index less than that desired for a natural cement raw material mixture and a chemical composition unsatisfactory for the manufacture of a desired Portland cement, and which is utilized as the common source of at least the principal proportion of a hydraulic cement raw material mixture and at least the principal proportion of a Portland cement raw material mixture, and in which the material is a member of the class consisting of agillaceous limestones, marls and chalks, each containing proportions of siliceous matter, including at least one silicate mineral, which can be released and increased in proportion to the calcium carbonate in the low orders of particle size, which comprises grinding the material to a degree sufficient to free a proportion of siliceous mineral particles, including said silicate mineral, at least equal to the proportion thereof desired for said hydraulic cement raw material mixture and to concentrate said proportion and increase the relative proportion of said siliceous mineral to the proportion of calcium carbonate in the low orders of particle size, subjecting a slurry of the material so ground to centrifugal sedimentation so correlated as to the speed of rotation, the dilution and rate of feeding of the material that the low orders of particle size are cut and separated as an effluent at that point in the particle size range where said low orders of particle size will have a cementation index not less than 1 and not more than 2, recovering and utilizing the higher orders of particle size as at least the major proportion of an ultimate Portland cement raw material mixture, burning said mixture to Portland cement clinker, grinding the clinker to cement fineness, thickening the low orders of particle size so separated and utilizing them as at least the major proportion of the ultimate hydraulic cement raw material mixture, burning said mixture separately from said higher orders of particle size for a time and at a temperature at least sufficient to liberate carbon dioxide but below that of incipient fusion, cooling the products resulting from burning said low orders of particle size and grinding them to cement fineness.

13. The method of manufacturing hydraulic cements and using substantially all of the weight of constituents of an available natural raw material, having a cementation index less than 1.2 and a chemical composition unsatisfactory for the manufacture of a desired Portland cement, and which is utilized as the common source of at least the principal proportion of a hydraulic cement raw material mixture and at least the principal proportion of a Portland cement raw material mixture, and in which the material is a member of the class consisting of argillaceous linestones, marls and chalks, each containing proportions of siliceous matter, including at least one silicate mineral, which can be released and increased in proportion to the calcium carbonate in the low orders of particle size, which comprises grinding the material to a degree sufficient to free a proportion of siliceous mineral particles, including said silicate mineral, at least equal to the proportion thereof desired for said hydraulic cement raw material mixture and to concentrate said proportion and increase the relative proportion of said siliceous mineral to the proportion of calcium carbonate in the low orders of particle size, subjecting a slurry of the material so ground to centrifugal sedimentation so correlated as to the speed of rotation, the dilution and rate of feeding of the material that the low orders of particle size are cut and separated as an effluent at that point in the particle size range where said low orders of particle size will have a cementation index not less than 1.2 and not more than 2, recovering and utilizing the higher orders of particle size as at least the major proportion of an ultimate Portland cement raw material mixture, burning said mixture to Portland cement clinker, grinding the clinker to cement fineness, thickening the low orders of particle size so separated and utilizing them as at least the major proportion of the ultimate hydraulic cement raw material mixture, burning said mixture separately from said higher orders of particle size for a time and at a temperature at least sufficient to liberate carbon dioxide but below that of incipient fusion, cooling the products resulting from burning said low orders of particle size and grinding them to cement fineness.

14. The method of manufacturing hydraulic cements and using substantially all of the weight of constituents of an available natural raw material, having a cementation index less than 1.2 and a chemical composition unsatisfactory for the manufacture of a desired Portland cement, and which is utilized as the common source of at least the principal proportion of a hydraulic cement raw material mixture and at least the principal proportion of a Portland cement raw material mixture, and in which the material is a member of the class consisting of argillaceous limestones, marls and chalks, each containing proportions of siliceous matter, including at least one silicate mineral, which can be released and increased in proportion to the calcium carbonate in the low orders of particle size, which comprises grinding the material to a degree sufficient to free a proportion of siliceous mineral particles, including said silicate mineral, at least equal to the proportion thereof desired for said hydraulic cement raw material mixture and to concentrate said proportion and increase the relative proportion of said siliceous mineral to the proportion of calcium carbonate in the low orders of particle size, subjecting a slurry of the material so ground to centrifugal sedimentation so correlated as to the speed of rotation, the dilution and rate of feeding of the material that the low orders of particle size are cut and separated as an effluent at that point in the particle size range where said low orders of particle size will have a cementation index not less than 1.2 and not more than 2, recovering and utilizing the higher orders of particle size as at least the major proportion of an ultimate Portland cement raw material mixture, burning said mixture to Portland cement clinker, grinding the clinker to cement fineness, thickening the low orders of particle size so separated and utilizing them as at least the major proportion of the ultimate hydraulic cement raw material mixture, burning said mixture separately from said higher orders of particle size for a time and at a temperature in excess of that necessary to liberate carbon dioxide but below that of incipient fusion, cooling the products resulting from burning said low orders of particle size and grinding them to cement fineness.

15. The method of manufacturing hydraulic cements and using substantially all of the weight of constituents of an available natural raw material, having a cementation index less than 1.2 and a chemical composition unsatisfactory for the manufacture of a desired Portland cement, and which is utilized as the common source of at least the principal proportion of a hydraulic cement raw material mixture and at least the principal proportion of a Portland cement raw material mixture, and in which the material is a member of the class consisting of argillaceous limestones, marls and chalks, each containing proportions of siliceous matter, including at least one silicate mineral, which can be released and increased in proportion to the calcium carbonate in the low orders of particle size, which comprises grinding the material to a degree sufficient to free a proportion of siliceous mineral particles, including said silicate mineral, at least equal to the proportion thereof desired for said hydraulic cement raw material mixture and to concentrate said proportion and increase the relative proportion of said siliceous mineral to the proportion of calcium carbonate in the low orders of particle size, subjecting a slurry of the material so ground to centrifugal sedimentation so correlated as to the speed of rotation, the dilution and rate of feeding of the material that the low orders of particle size are cut and separated as an effluent at that point in the particle size range where said low orders of particle size will have a cementation index not less than 1.2 and not more than 2, recovering and utilizing the higher orders of particle size as at least the major proportion of an ultimate Portland cement raw material mixture, burning said mixture to Portland cement clinker, grinding the clinker to cement fineness, thickening the low orders of particle size so separated and utilizing them as at least the major proportion of the ultimate hydraulic cement raw material mixture, burning said mixture separately from said higher orders of particle size for a time and at a temperature in excess of that necessary to liberate carbon dioxide but below that of incipient fusion, cooling the products resulting from burning said low orders of particle size and forming a pulverized mixture of said products and Portland cement in which the proportion of hydraulic cement is less than Portland cement.

CHARLES H. BREERWOOD.

CERTIFICATE OF CORRECTION.

Patent No. 2,288,179.  June 30, 1942.

CHARLES H. BREERWOOD.

It is hereby certified that error appears in the printed specification of the above numbered patent requiring correction as follows: Page 3, first column, line 60, for "similar" read --silica--; and that the said Letters Patent should be read with this correction therein that the same may conform to the record of the case in the Patent Office.

Signed and sealed this 25th day of August, A. D. 1942.

(Seal)

Henry Van Arsdale,
Acting Commissioner of Patents.